(12) United States Patent
Zielke et al.

(10) Patent No.: US 7,975,478 B2
(45) Date of Patent: Jul. 12, 2011

(54) INTERNAL COMBUSTION ENGINE HAVING COMPRESSOR WITH FIRST AND SECOND TRIBUTARY INLETS

(75) Inventors: Martin R. Zielke, Homer Glen, IL (US); Qianfan Xin, Lake Zurich, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 467 days.

(21) Appl. No.: 11/768,480

(22) Filed: Jun. 26, 2007

(65) Prior Publication Data

US 2009/0000275 A1 Jan. 1, 2009

(51) Int. Cl.
*F02B 33/44* (2006.01)
*F02B 37/00* (2006.01)
*F02M 25/07* (2006.01)
*F01N 3/00* (2006.01)
*F01N 3/02* (2006.01)

(52) U.S. Cl. ....... 60/605.2; 60/612; 60/285; 123/568.12

(58) Field of Classification Search .......... 60/605.2, 60/612, 285; 123/562, 568.12, 568.18; *F02B 37/00, F02B 37/02, 37/12, 37/007; F02M 25/07*
See application file for complete search history.

(56) References Cited

U.S. PATENT DOCUMENTS

| 5,327,725 | A * | 7/1994 | Mitsubori | 60/605.2 |
| 6,338,245 | B1 | 1/2002 | Shimoda et al. | 60/285 |
| 7,165,403 | B2 * | 1/2007 | Sun et al. | 60/605.2 |
| 7,278,411 | B1 * | 10/2007 | Fluga et al. | 123/568.12 |
| 7,490,462 | B2 * | 2/2009 | Roozenboom et al. | 60/605.2 |

FOREIGN PATENT DOCUMENTS

| EP | 620365 A1 | * | 10/1994 |
| JP | 06147026 A | * | 5/1994 |
| JP | 2002276405 A | * | 9/2002 |
| JP | 2003129874 A | * | 5/2003 |
| JP | 2005098124 A | * | 4/2005 |
| JP | 2008121635 A | * | 5/2008 |
| JP | 2008261294 A | * | 10/2008 |
| JP | 2009114952 A | * | 5/2009 |

* cited by examiner

*Primary Examiner* — Thai Ba Trieu
(74) *Attorney, Agent, or Firm* — Jack D. Nimz; Jeffrey P. Calfa

(57) ABSTRACT

An internal combustion engine (100) includes an intake manifold (106) and at least one exhaust manifold (108). A first compressor (120) that is operably associated with a first turbine (128) has a first air inlet (126) and a first air outlet (118). The first air inlet (126) is adapted to admit air into the first compressor (120), and the first air outlet (118) is fluidly connected to the intake manifold (106). The first turbine (128) fluidly communicates with a tailpipe (138). A second compressor (124) is operably associated with a second turbine (160) and has a first tributary fluid inlet (152), a second tributary fluid inlet (154), and a second fluid outlet (122). The first tributary fluid inlet (152) is fluidly connected to the tailpipe (138) at a junction (147), the second tributary fluid inlet (154) is adapted to admit air into the second compressor (124), and the second fluid outlet (122) is fluidly connected to the intake manifold (106). The second turbine (160) is fluidly connected to the tailpipe (138).

6 Claims, 4 Drawing Sheets

INTERNAL COMBUSTION ENGINE HAVING COMPRESSOR WITH FIRST AND SECOND TRIBUTARY INLETS

FIELD OF THE INVENTION

This invention relates to internal combustion engines, including but not limited to pumping of exhaust gas for recirculation thereof into an intake system of the engine.

BACKGROUND OF THE INVENTION

Internal combustion engines typically have an intake system that is adapted to supply air, or a mixture of air and exhaust gas, into a plurality of cylinders. Addition of fuel in the cylinders and subsequent combustion of a mixture of air and fuel in the cylinder yields power while the engine operates. Exhaust gas produced after the combustion in each cylinder is exhausted from the engine through an exhaust system.

Typical engines recirculate a portion of exhaust gas from the exhaust system, through a valve, into the intake system of the engine. The recirculated exhaust gas is used to displace oxygen from the air entering the cylinders, and lead to engine operation the generates lower emissions. This method of lowering engine emissions is commonly referred to as exhaust gas recirculation (EGR) and is quite commonly used.

A typical EGR system for an engine requires a pressure differential to function. This pressure differential should be present between the exhaust and intake systems of an engine, whereby a pressure in the exhaust system should be higher than a pressure in the intake system such that exhaust gas is compelled to flow from the exhaust system into the intake system. This configuration, even though effective for compelling flow of EGR gas, is ineffective in producing desired engine operating parameters, such as low fuel consumption, low pumping losses, increased heat rejection to the engine's cooling system, and so forth.

These issues have been addressed in the past by, for example, use of pumps that pump EGR gas from an exhaust system pressure up to and above an intake system pressure. Such pumps have typically been secondary devices added to the engine that operate under a variety of configurations, including mechanical, hydraulic, or electrical power. Use of such secondary devices is generally impractical, expensive, energy inefficient, and complex.

SUMMARY OF THE INVENTION

An internal combustion engine includes an intake manifold and at least one exhaust manifold. A first compressor that is operably associated with a first turbine has a first air inlet and a first air outlet. The first air inlet is adapted to admit air into the first compressor, and the first air outlet is fluidly connected to the intake manifold, the first turbine fluidly communicates with a tailpipe. A second compressor is operably associated with a second turbine and has a first tributary fluid inlet, a second tributary fluid inlet, and a second fluid outlet. The first tributary fluid inlet is fluidly connected to the tailpipe at a junction, the second tributary fluid inlet is adapted to admit air into the second compressor, and the second fluid outlet is fluidly connected to the intake manifold. The second turbine is fluidly connected to the tailpipe.

DESCRIPTION OF PREFERRED EMBODIMENTS

The following describes an apparatus for and method of pumping exhaust gas from an exhaust system of an engine into an intake system of the engine by use of a compressor that is part of a turbocharger connected to the engine. Various embodiments are described herein in more detail, but other engine configurations in addition to the ones presented here are contemplated. The configurations or embodiments presented herein are adapted for engines having either an inline or "V" configuration, and that operate under a heavy or light duty cycle.

Figure 1:
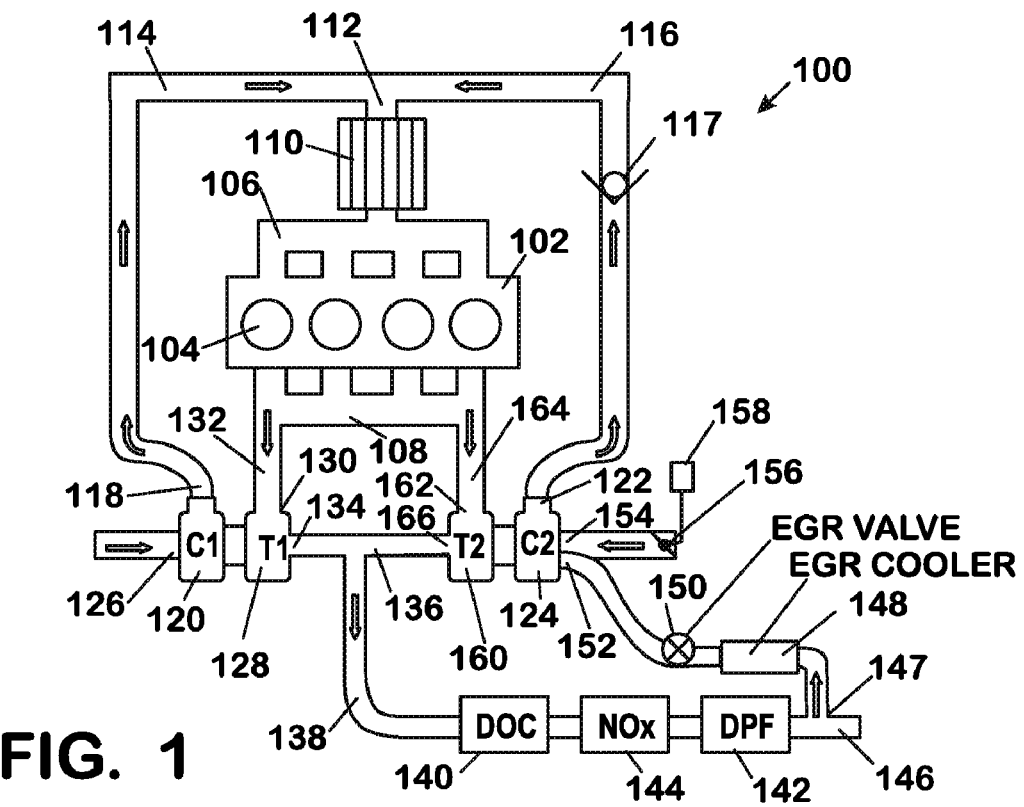
FIG. 1 is a block diagram of a first embodiment of an internal combustion engine having a compressor in accordance with the invention.

A block diagram of a first embodiment of an engine 100 having an inline cylinder configuration is shown in FIG. 1. The engine 100 includes a crankcase 102 having a plurality of cylinders 104 formed therein. Each of the cylinders 104 is fluidly connected to an intake manifold 106, and an exhaust manifold 108. Alternatively, the exhaust manifold 108 can be divided into two or more portions, with each portion communicating with one or more corresponding groups of cylinders. During operation of the engine 100, air or a mixture of air and exhaust gas enters the intake manifold 106 after being cooled in a charge air cooler (CAC) 110. The flow of air or the mixture of air and exhaust gas, generally referred to as an intake fluid flow, is denoted by solid-head arrows. The intake fluid flow enters the CAC 110 through a junction 112.

The junction 112 joins portions of the intake fluid flow that are coming from either a first intake fluid passage 114 and a second intake fluid passage 116. Each of the first and second fluid passages 114 and 116 are connected respectively to a first outlet 118 of a first compressor 120 and to a second outlet 122 of a second compressor 124. The second intake fluid passage 116 contains an optional check valve 117 that prevents back-flow from the first fluid passage 114 into the outlet 122 of the second compressor 124.

The first compressor 120 has a first air inlet 126 that is adapted to admit fresh air into to the first compressor 120. Fresh air entering the first compressor 120 through the first air inlet 126 is compressed in a compressor housing and exits the compressor 120 via the first outlet 118 to enter the first fluid passage 114 and become a portion of the intake fluid flow of the engine. The first compressor 120 is operably connected in a known fashion to a first turbine 128. The first turbine 128 has a first gas inlet 130 that is fluidly connected directly to the exhaust manifold 108 via a first turbine gas supply passage 132.

Exhaust gas from the exhaust manifold 108 enters the first turbine 128 through the first gas inlet 130 during operation of the engine 100. Exhaust gas entering the first turbine 128 spins a wheel, as is known, and generates work that is consumed by the first compressor 120 during operation. Exhaust gas exits the first turbine 128 through a first gas outlet 134, enters a common outlet passage 136, and follows a path to the atmosphere through a tailpipe 138. Exhaust gas passing through the tailpipe 138 may optionally be physically and/or chemically treated by passing through various optional after-treatment components included in the tailpipe 138, such as a diesel oxidation catalyst 140, a diesel particulate filter 142, a nitrous oxide trap 144, and so forth. Filtered and treated exhaust gas exits the tailpipe through a tip 146.

A portion of the exhaust gas passing through the tailpipe 138 is diverted at an exhaust junction 147 that is located before the tip 146. The exhaust gas being diverted at the junction 147 is advantageously diverted before reaching the tip 146 and after having past through one or more after-treatment components. The portion of exhaust gas that is diverted at the junction 147 is exhaust gas that will be recirculated into the intake manifold 106 of the engine 100. The portion of exhaust gas being diverted before the tip 146 passes, in no particular order, through an EGR cooler 148 and an EGR valve 150 before entering the second compressor 124. The second compressor 124 is constructed with two tributary inlet ports that are capable of independent fluid connections to different sources of fluids that can enter the second compressor 124 during operation. A first tributary inlet port 152 fluidly communicates with the junction 147 and allows exhaust gas being recirculated to enter the second compressor 124. A second tributary inlet port 154 is used for admitting fresh air into the second compressor 124.

A flow of air or exhaust gas through each of the first and second tributary inlet ports 152 and 154 may be controlled by a three way valve, or by a two-way valve 156 disposed upstream of the second tributary inlet port 154 and controlled by an actuator 158. Advantageously, the optional EGR valve 150 may be eliminated from all embodiments described herein when the two-way valve 156 is controlled effectively. The second compressor 124 is connected in a known fashion to a second turbine 160. The second turbine 160 has a gas inlet 162 connected to the exhaust manifold 108 through a second turbine gas supply passage 164, and has a second gas outlet 166 that is connected to the common outlet passage 136.

During operation of the engine 100, the second compressor 124 advantageously pumps exhaust gas to be recirculated. The exhaust gas that is recirculated is diverted at the junction 147 from the tailpipe 138, enters the second compressor 124 through the first tributary inlet port 152, is compressed in the compressor 124, exits the compressor 124 via the outlet 122, enters the CAC 110 through the second inlet fluid passage 116 and junction 112, and passes into the cylinders 104 through the intake manifold 106.

Figure 2:
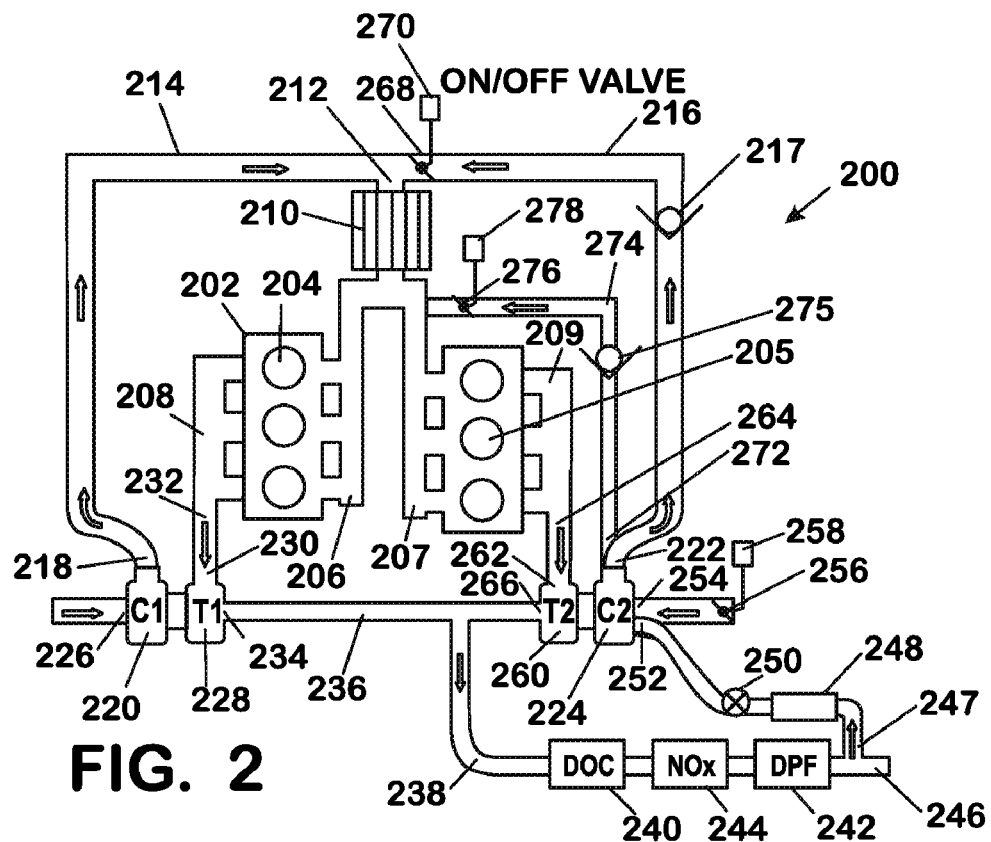
FIG. 2 is a block diagram of a second embodiment of an internal combustion engine having a compressor in accordance with the invention.

A block diagram of a second embodiment of an engine 200 having a "V" cylinder configuration is shown in FIG. 2. The engine 200 includes a crankcase 202 having a first bank of cylinders 204 and a second bank of cylinders 205 formed therein. Each cylinder of the first bank of cylinders 204 is fluidly connected to a first intake runner 206, and to a first exhaust manifold 208. Each cylinder of the second bank of cylinders 205 is connected to a second intake runner 207 and to a second exhaust manifold 209. During operation of the engine 200, air or a mixture of air and exhaust gas enters the intake runners 206 and 207 after being cooled in a charge air cooler (CAC) 210. The flow of air or the mixture of air and exhaust gas, generally referred to as an intake fluid flow, is denoted by solid-head arrows. The intake fluid flow enters the CAC 210 through a junction 212.

The junction 212 joins portions of the intake fluid flow that are coming from either a first intake fluid passage 214 and, selectively, a second intake fluid passage 216. Each of the first and second fluid passages 214 and 216 are connected respectively to a first outlet 218 of a first compressor 220 and to a second outlet 222 of a second compressor 224. The second intake fluid passage 216 contains an optional check valve 217 that prevents back-flow from the first fluid passage 214 into the outlet 222 of the second compressor 224.

The first compressor 220 has a first air inlet 226 that is adapted to admit fresh air into to the first compressor 220. Fresh air entering the first compressor 220 through the first air inlet 226 is compressed in a compressor-housing and exits the compressor 220 via the first outlet 218 to enter the first fluid passage 214 and become a portion of the intake fluid flow of the engine. The first compressor 220 is operably connected in a known fashion to a first turbine 228. The first turbine 228 has a first gas inlet 230 that is fluidly connected directly to the first exhaust manifold 208 via a first turbine gas supply passage 232.

Exhaust gas from the first exhaust manifold 208 enters the first turbine 228 through the first gas inlet 230 during operation of the engine 200. Exhaust gas entering the first turbine 228 spins a wheel, as is known, and generates work that is consumed by the first compressor 220 during operation. Exhaust gas exits the first turbine 228 through a first gas outlet 234, enters a common outlet passage 236, and follows a path to the atmosphere through a tailpipe 238 after passing through various after-treatment components included in the tailpipe 238, such as a diesel oxidation catalyst 240, a diesel particulate filter 242, a nitrous oxide trap 244, and so forth. Filtered and treated exhaust gas exits the tailpipe through a tip 246.

A portion of the exhaust gas passing through the tailpipe 238 is diverted at an exhaust junction 247 that is located before the tip 246. The exhaust gas being diverted at the junction 247 is advantageously diverted before reaching the tip 246 and after having past through one or more after-treatment components. The portion of exhaust gas that is diverted at the junction 247 is exhaust gas that will be recirculated into the intake runners 206 and 207 of the engine 200. The portion of exhaust gas being diverted passes, in no particular order, through an EGR cooler 248 and an EGR valve 250 before entering the second compressor 224. The second compressor 224 is constructed with two tributary inlet ports that are capable of independent fluid connections to different sources of fluids that can enter the second compressor 224 during operation. A first tributary inlet port 252 fluidly communicates with the junction 247 and allows exhaust gas being recirculated to enter the second compressor 224. A second tributary inlet port 254 is used for admitting fresh air into the second compressor 224.

A flow of air or exhaust gas through each of the first and second tributary inlet ports 252 and 254 may be controlled by a three way valve, or by a two-way intake throttle valve 256 disposed upstream of the second tributary inlet port 254 and controlled by an actuator 258. The second compressor 224 is connected in a known fashion to a second turbine 260. The second turbine 260 has a gas inlet 262 connected to the second exhaust manifold 209 through a second turbine gas supply passage 264, and has a second gas outlet 266 that is connected to the common outlet passage 236.

The second inlet fluid passage 216 selectively connects the outlet 222 of the second compressor 224 with the inlet junction 212. A two way air shutoff valve 268 is disposed in the second fluid passage 216 between the inlet junction 212 and the outlet 222 of the second compressor 224. The air shutoff valve 268 is selectively operated by an actuator 270 and is capable of fluidly isolating the inlet junction 212 from the outlet 222 of the second compressor 224. At times when the air shutoff valve 268 is completely closed, compressed fluid exiting the second compressor 224 can follow a high pressure outlet port 272 that is in fluid communication with the outlet port 222. The high pressure outlet port 272 is fluidly connected directly to the first and second intake runners 206 and 207 and bypasses the charge air cooler 210. A high pressure passage 274 containing an EGR shutoff valve 276 fluidly connects the high pressure outlet 272 directly to the first and second intake runners 206 and 207. The EGR shutoff valve 276 is selectively operated by an actuator 278. The high pressure passage 274 also contains an optional check valve 275 that prevents backflow from the junction 212 from flowing toward the second outlet 222 of the second compressor 224. The check valve 275 is optional.

During operation of the engine 200, the second compressor 224 advantageously pumps exhaust gas to be recirculated. The exhaust gas that is recirculated is diverted at the junction 246 from the tailpipe 238, enters the second compressor 224 through the first tributary inlet port 252, and is compressed in the compressor 224. Depending on the operating conditions of the engine 200, the compressed fluid at the outlet 222 of the second compressor can follow one of two paths.

The first path is followed at times when the air shutoff valve 268 is open, the EGR shutoff valve 276 is closed, and the intake throttle valve 256 is open. The first path is defined between the outlet 222 of the second compressor 224, through the second fluid passage 216, through the air shutoff valve 268, through the junction 212, through the CAC 210, and into the first and second intake runners 206 and 207. Under this condition, the engine operates in a little to no EGR flow mode.

The second path is followed at times when the air shutoff valve 268 is closed, the EGR shutoff valve 276 is open, and the intake throttle valve 256 is closed. The second path is defined between the outlet 222 of the second compressor 224, through the high pressure passage 274, through the EGR shutoff valve 276, and into the first and second intake runners 206 and 207 thus bypassing the junction 212 and the CAC 210. Under this condition, the second compressor 224 effectively operates as an EGR pump and primarily pumps exhaust gas to be recirculated. Fresh air required for engine operation, in this condition, is pumped by the first compressor 220.

Figure 3:
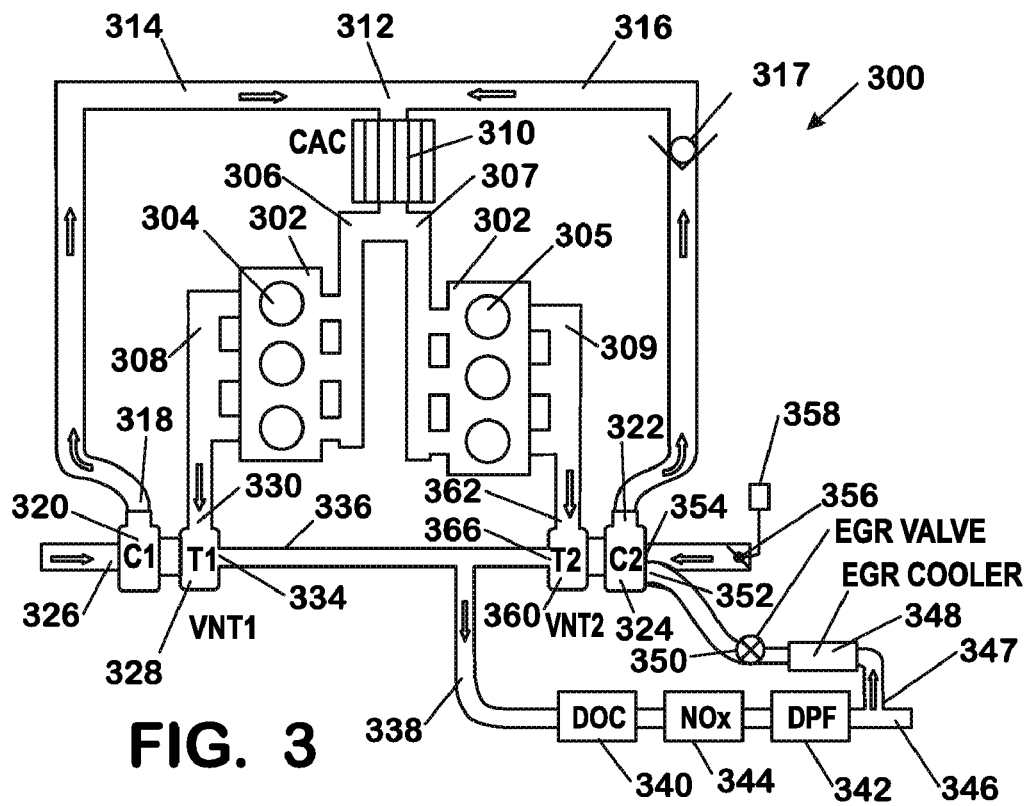
FIG. 3 is a block diagram of a third embodiment of an internal combustion engine having a compressor in accordance with the invention.

A block diagram of a third embodiment of an engine 300 having a "V" cylinder configuration is shown in FIG. 3. The engine 300 includes a crankcase 302 having a first bank of cylinders 304 and a second bank of cylinders 305 formed therein. Each cylinder of the first bank of cylinders 304 is fluidly connected to a first intake runner 306, and to a first exhaust manifold 308. Each cylinder of the second bank of cylinders 305 is connected to a second intake runner 307 and to a second exhaust manifold 309. During operation of the engine 300, air or a mixture of air and exhaust gas enters the intake runners 306 and 307 after being cooled in a charge air cooler (CAC) 310. The flow of air or the mixture of air and exhaust gas, generally referred to as an intake fluid flow, is denoted by solid-head arrows. The intake fluid flow enters the CAC 310 through a junction 312.

The junction 312 joins portions of the intake fluid flow that are coming from either a first intake fluid passage 314 and a second intake fluid passage 316. Each of the first and second fluid passages 314 and 316 are connected respectively to a first outlet 318 of a first compressor 320 and to a second outlet 322 of a second compressor 324. The second intake fluid passage 316 contains an optional check valve 317 that prevents back-flow from the first fluid passage 314 into the outlet 322 of the second compressor 324.

The first compressor 320 has a first air-inlet 326 that is adapted to admit fresh air into to the first compressor 320. Fresh air entering the first compressor 320 through the first air inlet 326 is compressed in a compressor-housing and exits the compressor 320 via the first outlet 318 to enter the first fluid passage 314 and become a portion of the intake fluid flow of the engine 300. The first compressor 320 is operably connected in a known fashion to a first turbine 328. The first turbine 328 has a first gas inlet 330 that is fluidly connected directly to the first exhaust manifold 308.

Exhaust gas from the first exhaust manifold 308 enters the first turbine 328 through the first gas inlet 330 during operation of the engine 300. Exhaust gas entering the first turbine 328 spins a wheel, as is known, and generates work that is consumed by the first compressor 320 during operation. Exhaust gas exits the first turbine 328 through a first gas outlet 334, enters a common outlet passage 336, and follows a path to the atmosphere through a tailpipe 338 after passing through various after-treatment components included in the tailpipe 338, such as a diesel oxidation catalyst 340, a diesel particulate filter 342, a nitrous oxide trap 344, and so forth. Filtered and treated exhaust gas exits the tailpipe through a tip 346.

A portion of the exhaust gas passing through the tailpipe 338 is diverted at an exhaust junction 347 that is located before the tip 346. The exhaust gas being diverted at the junction 347 is advantageously diverted before reaching the tip 346 and after having past through one or more after-treatment components. The portion of exhaust gas that is diverted at the junction 347 is exhaust gas that will be recirculated into the intake runners 306 and 307 of the engine 300. The portion of exhaust gas being diverted passes, in no particular order, through an EGR cooler 348 and an EGR valve 350 before entering the second compressor 324. The second compressor 324 is constructed with two tributary inlet ports that are capable of independent fluid connections to different sources of fluids that can enter the second compressor 324 during operation. A first tributary inlet port 352 fluidly communicates with the junction 347 and allows exhaust gas being recirculated to enter the second compressor 324. A second tributary inlet port 354 is used for admitting fresh air into the second compressor 324.

A flow of air or exhaust gas through each of the first and second tributary inlet ports 352 and 354 may be controlled by a three way valve, or by a two-way valve 356 disposed upstream of the second tributary inlet port 354 and controlled by an actuator 358. The second compressor 324 is connected in a known fashion to a second turbine 360. The second turbine 360 has a gas inlet 362 connected to the second exhaust manifold 309 and has a second gas outlet 366 that is connected to the common outlet passage 336.

During operation of the engine 300, the second compressor 324 advantageously pumps exhaust gas to be recirculated. The exhaust gas that is recirculated is diverted at the junction 347 from the tailpipe 338, enters the second compressor 324 through the first tributary inlet port 352, is compressed in the compressor 324, exits the compressor 324 via the outlet 322, enters the CAC 310 through the second inlet fluid passage 316 and junction 312, and passes into the cylinders 304 and 305 through the intake runners 306 and 307.

Figure 4:
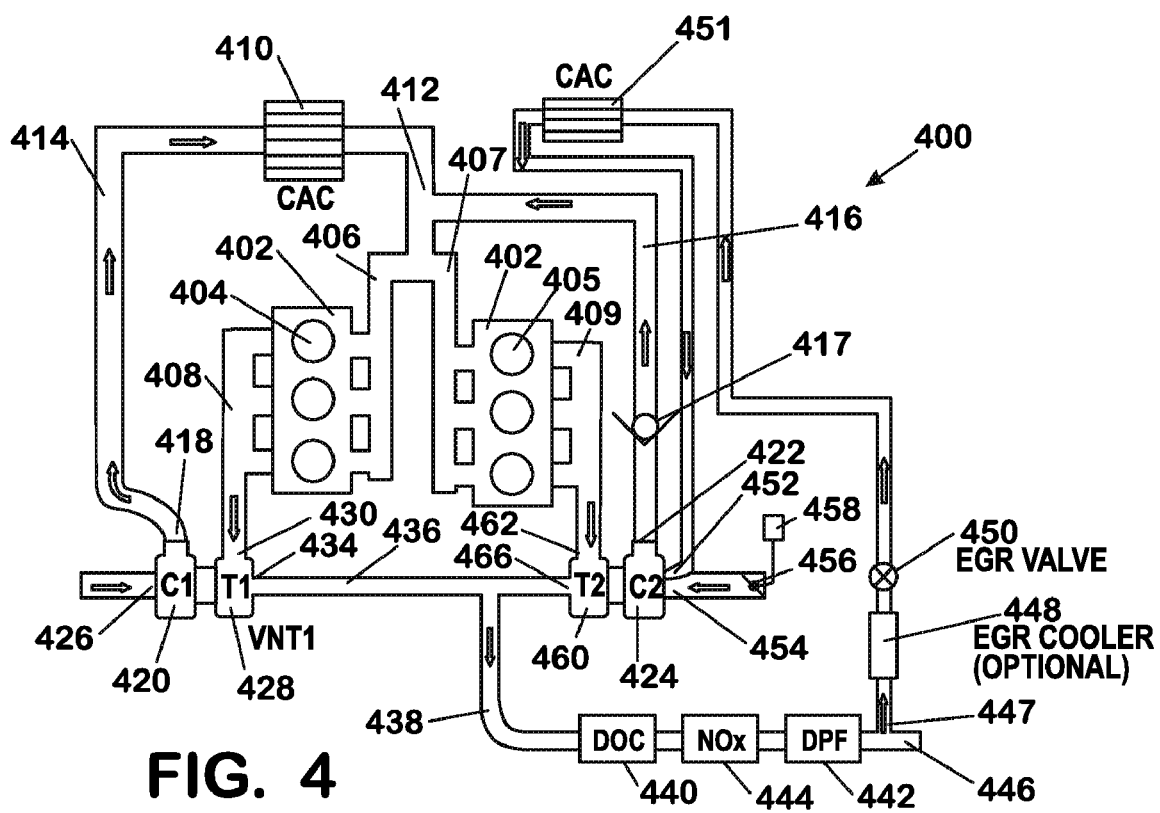
FIG. 4 is a block diagram of a fourth embodiment of an internal combustion engine having a compressor in accordance with the invention.

A block diagram of a fourth embodiment of an engine 400 having a "V" cylinder configuration is shown in FIG. 4. The engine 400 includes a crankcase 402 having a first bank of cylinders 404 and a second bank of cylinders 405 formed therein. Each cylinder of the first bank of cylinders 404 is fluidly connected to a first intake runner 406, and to a first exhaust manifold 408. Each cylinder of the second bank of cylinders 405 is connected to a second intake runner 407 and to a second exhaust manifold 409. During operation of the engine 400, air enters the intake runners 406 and 407 after being cooled in a charge air cooler (CAC) 410.

Air entering the CAC 410 comes from a first intake fluid passage 414. Air exiting the CAC 410 passes through a junction 412 where it is mixed with a flow of fluid coming from a second intake fluid passage 416. Each of the first and second fluid passages 414 and 416 are connected respectively to a first outlet 418 of a first compressor 420 and to a second outlet 422 of a second compressor 424. The second intake fluid passage 416 contains an optional check valve 417 that prevents back-flow from the first fluid passage 414 into the outlet 422 of the second compressor 424.

The first compressor 420 has a first air-inlet 426 that is adapted to admit fresh air into to the first compressor 420. Fresh air entering the first compressor 420 through the first air inlet 426 is compressed in a compressor-housing and exits the compressor 420 via the first outlet 418 to enter the first fluid passage 414 and become a portion of the intake fluid flow of the engine 400. The first compressor 420 is operably connected in a known fashion to a first turbine 428. The first turbine 428 has a first gas inlet 430 that is fluidly connected directly to the first exhaust manifold 408.

Exhaust gas from the first exhaust manifold 408 enters the first turbine 428 through the first gas inlet 430 during operation of the engine 400. Exhaust gas entering the first turbine 428 spins a wheel, as is known, and generates work that is consumed by the first compressor 420. Exhaust gas exits the first turbine 428 through a first gas outlet 434, enters a common outlet passage 436, and follows a path to the atmosphere through a tailpipe 438 after passing through various aftertreatment components included in the tailpipe 438, such as a diesel oxidation catalyst 440, a diesel particulate filter 442, a nitrous oxide trap 444, and so forth. Filtered and treated exhaust gas exits the tailpipe through a tip 446.

A portion of the exhaust gas passing through the tailpipe 438 is diverted at an exhaust junction 447 that is located before the tip 446. The exhaust gas being diverted at the junction 447 is advantageously diverted before reaching the tip 446 and after having past through one or more aftertreatment components. The portion of exhaust gas that is diverted at the junction 447 is exhaust gas that will be recirculated into the intake runners 406 and 407 of the engine 400. The portion of exhaust gas being diverted passes, in no particular order, through an EGR cooler 448, an EGR valve 450, and a secondary CAC 451 before entering the second compressor 424. The second compressor 424 is constructed with two tributary inlet ports that are capable of independent fluid connections to different sources of fluids that can enter the second compressor 424 during operation. A first tributary inlet port 452 fluidly communicates with the junction 447 and allows exhaust gas being recirculated to enter the second compressor 424. A second tributary inlet port 454 is used for admitting fresh air into the second compressor 424.

A flow of air or exhaust gas through each of the first and second tributary inlet ports 452 and 454 may be controlled by a three way valve, or by a two-way valve 456 disposed upstream of the second tributary inlet port 454 and controlled by an actuator 458. The second compressor 424 is connected in a known fashion to a second turbine 460. The second turbine 460 has a gas inlet 462 connected to the second exhaust manifold 409 and has a second gas outlet 466 that is connected to the common outlet passage 436.

During operation of the engine 400, the second compressor 424 advantageously pumps exhaust gas to be recirculated. The exhaust gas that is recirculated is diverted at the junction 447 from the tailpipe 438, passes through the EGR cooler 448, the EGR valve 450, and the secondary CAC cooler 451, enters the second compressor 424 through the first tributary inlet port 452, is compressed in the compressor 424, exits the compressor 424 via the outlet 422, enters the junction 412, and passes into the cylinders 404 through the intake runners 406 and 407.

Figure 5:
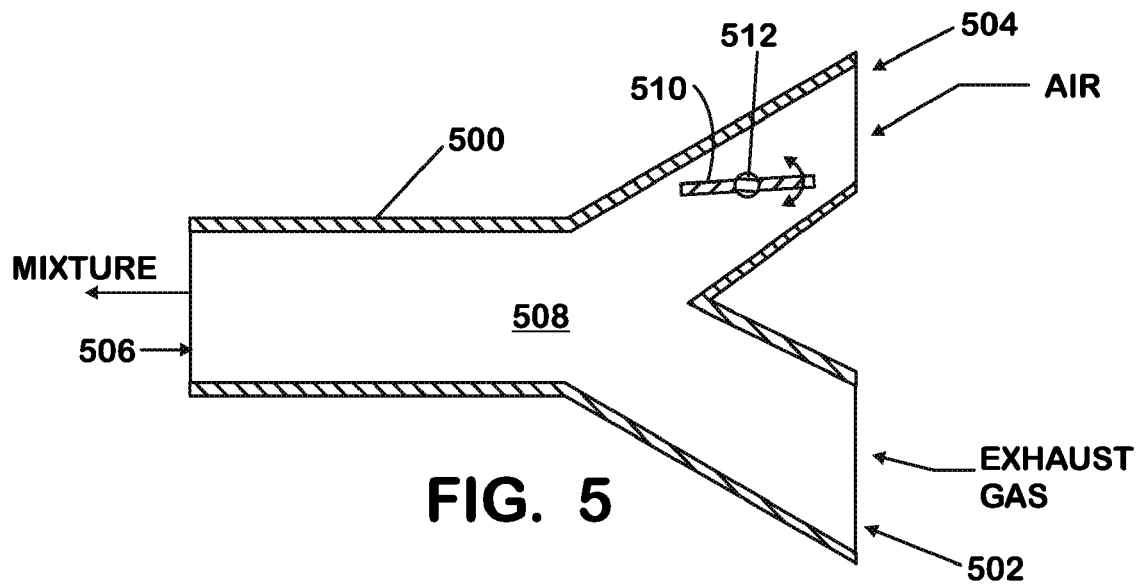
FIG. 5 is a cross-section view of a Y-pipe segment for use with a compressor in accordance with the invention.

A cross-section view of one embodiment for a compressor inlet having two tributary passages is shown in FIG. 5. A Y-pipe segment 500 has a first tributary inlet opening 502, a second tributary inlet opening 504, and a Y-pipe outlet opening 506. As denoted in the figure, during operation of an engine exhaust gas enters the Y-pipe segment 500 through the first tributary opening 502. Air enters the Y-pipe segment 500 through the second tributary opening 504. The exhaust gas and air mix in a crossroad region 508 to yield a mixture that exits the Y-pipe segment 500 through the Y-pipe outlet opening 506 and enters a compressor as described above. A flow of air into the crossroad region 508 may advantageously be controlled depending on a desired flow of exhaust gas through the first tributary opening 502. A valve 510 is disposed in a fluid passage between the second tributary opening 504 and the crossroad region 508 such that a flow of air entering the Y-pipe segment 500 may be controlled as desired. The valve 510 may be connected to an actuator (not shown) as is known, and is adapted to move around a shaft 512 such that flow of air is controlled, but other types of valves can be used. The valve 510 advantageously enables selection of flow out of the compressor outlet opening 506 that includes a higher percentage by volume of air, or exhaust gas, or any combination of the two fluids.

Figure 6:
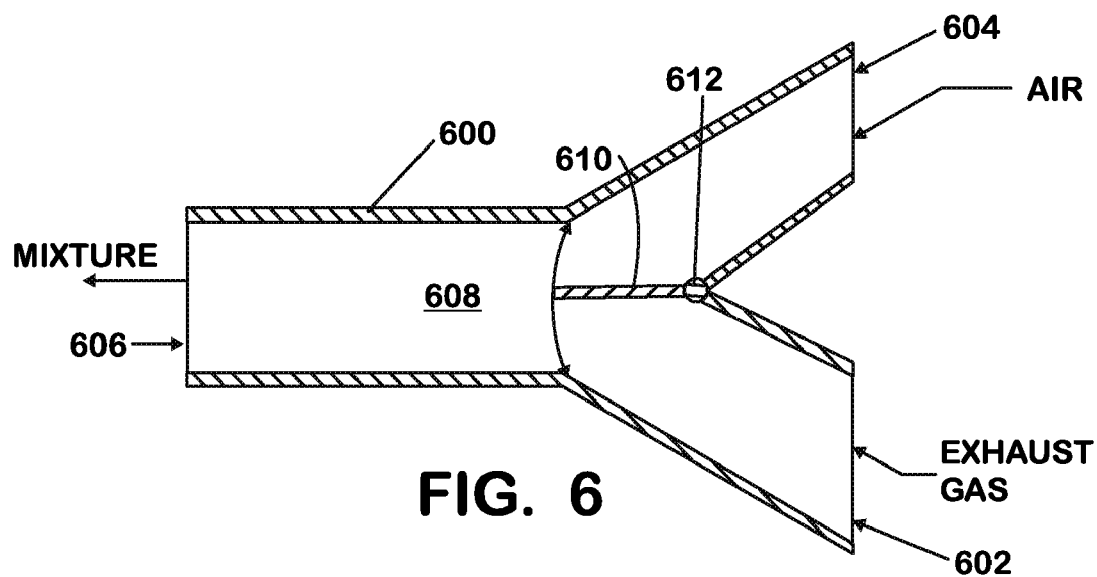
FIG. 6 is a cross-section view of an alternate embodiment for a Y-pipe segment for use with a compressor in accordance with the invention.

A cross-section view of an alternate embodiment for a compressor inlet having two tributary passages is shown in FIG. 6. In this embodiment, a Y-pipe segment 600 has a first tributary inlet opening 602, a second tributary inlet opening 604, and a Y-pipe outlet opening 606. During operation of an engine, exhaust gas enters the Y-pipe segment 600 through the first tributary opening 602. Air enters the Y-pipe segment 600 through the second tributary opening 604. The exhaust gas and air mix in a crossroad region 608 to yield a mixture that exits the Y-pipe segment 600 through the Y-pipe outlet opening 606 before entering a compressor. A flow of air and/or exhaust gas into the crossroad region 608 may advantageously be controlled. A valve 610 is disposed adjacent to the crossroad region 608 such that a flow of air and/or a flow of exhaust gas entering the Y-pipe segment 600 may be controlled as desired. The valve 610 may be connected to an actuator (not shown) as is known, and is adapted to move around a shaft 612 such that flow of air and/or exhaust gas is controlled, but other types of valves may be used. The valve 610 advantageously enables selection of flow out of the compressor outlet opening 606 that includes a higher percentage by volume of air, or exhaust gas, or any combination of the two fluids.

Figure 7:
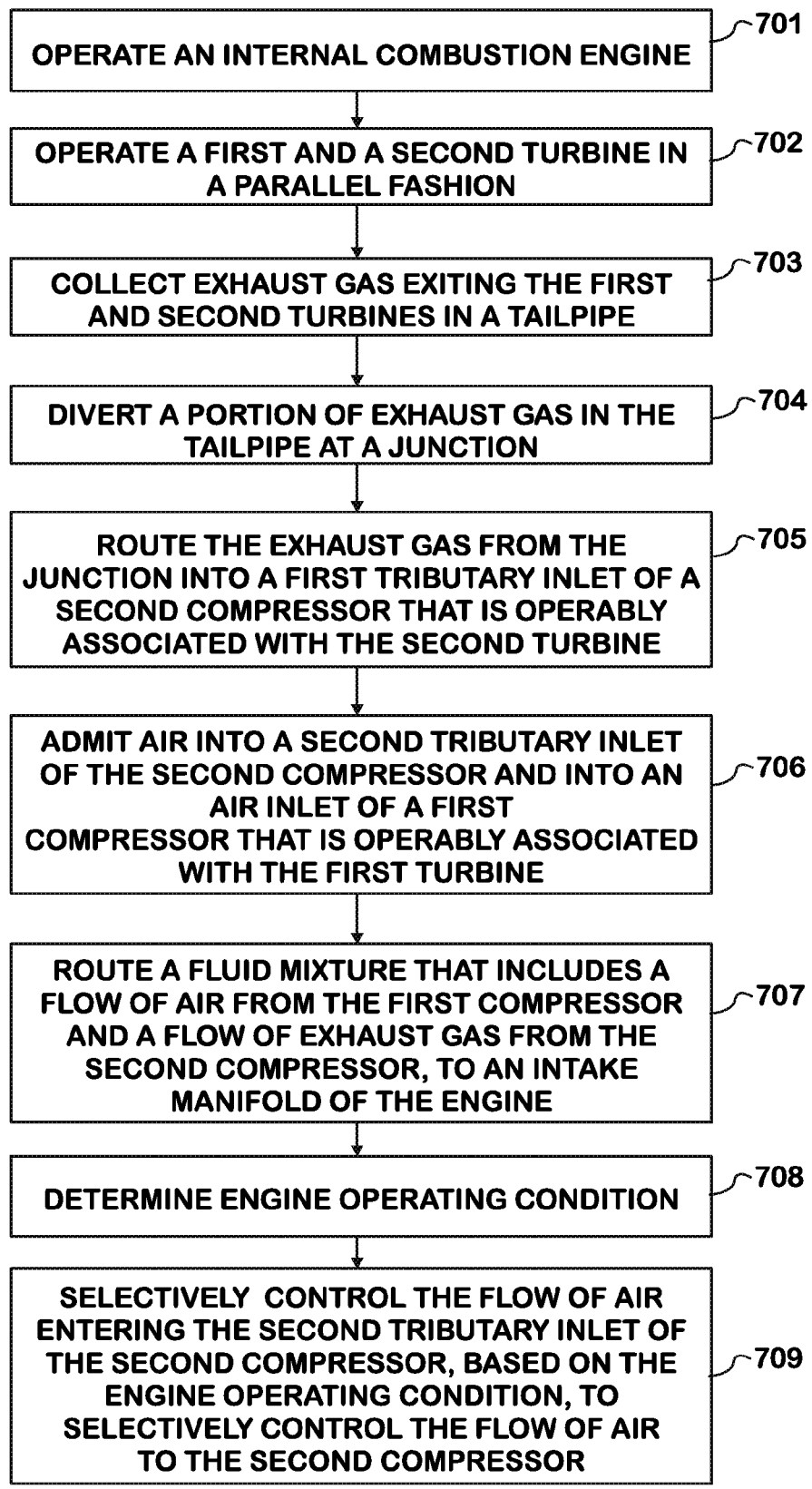
FIG. 7 is a flowchart illustrating a method for recirculating exhaust gas in an internal combustion engine in accordance with various aspects of the present invention.

A flowchart illustrating a method for recirculating exhaust gas in an internal combustion engine is shown in FIG. 7. At step 701, the engine is operated. During operation of the engine, the first and second turbines are operated in a parallel fashion as described above at step 702. At step 703, exhaust gas exiting the first and second turbines is collected in a tailpipe. At step 704, a portion of the exhaust gas passing through the tailpipe is diverted at an exhaust junction. From the junction, the exhaust gas is routed into a tributary inlet of a second compressor that is operably associated with the second turbine at step 705. This is followed by step 706, where air is admitted into a second tributary inlet of the second compressor and into an air inlet of a first compressor that is operably associated with the second turbine. At step

707, a fluid mixture that includes a flow of air from the first compressor and a flow of exhaust gas from the second compressor is routed to an intake manifold of the engine. After the engine operating condition is determined at step 708, the flow of air entering the second tributary inlet of the second compressor is selectively controlled, to selectively control the flow of air to the second compressor at step 709.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for recirculating exhaust gas in an internal combustion engine, comprising the steps of:
    operating the internal combustion engine;
    operating a first and a second turbine in a parallel fashion;
    collecting exhaust gas exiting the first and second turbines in a tailpipe;
    diverting a portion of exhaust gas in the tailpipe at a junction;
    routing the exhaust gas from the junction into a first tributary inlet of a second compressor that is operably associated with the second turbine;
    admitting air into a second tributary inlet of the second compressor and into an air inlet of a first compressor that is operably associated with the first turbine;
    routing a fluid mixture that includes a flow of air from the first compressor and a flow of exhaust gas from the second compressor, to an intake manifold of the engine;
    determining an engine operating condition;
    selectively controlling the flow of air entering the second tributary inlet of the second compressor, based on the engine operating condition, to selectively control the flow of air to the second compressor.

2. The method of claim 1, further comprising the step of treating exhaust gas passing through the tailpipe by performing at least one of: a filtering, catalyzing, or trapping exhaust gas constituents.

3. The method of claim 1, further comprising the step of cooling the portion of exhaust gas taken from the tailpipe at the junction.

4. The method of claim 1, further comprising the step of controlling a rate of flow of the portion of exhaust gas taken from the tailpipe at the junction.

5. The method of claim 1, further comprising the step of combining a flow of air from the first compressor with a flow of either fresh air, exhaust gas or a combination of both from the second compressor to yield a mixture.

6. The method of claim 5, further comprising the step of cooling the mixture in a charge air cooler before admitting the mixture into the intake manifold.

* * * * *